(12) United States Patent
Lappe

(10) Patent No.: US 8,801,999 B2
(45) Date of Patent: Aug. 12, 2014

(54) HYDRAULIC STRETCHING

(75) Inventor: Ulrich Lappe, Regensburg (DE)

(73) Assignee: Krones AG, Neutraubling (DE)

( * ) Notice: Subject to any disclaimer, the term of this patent is extended or adjusted under 35 U.S.C. 154(b) by 28 days.

(21) Appl. No.: 13/474,751

(22) Filed: May 18, 2012

(65) Prior Publication Data

US 2012/0294973 A1    Nov. 22, 2012

(30) Foreign Application Priority Data

May 18, 2011  (DE) .......................... 10 2011 076 062

(51) Int. Cl.
 *B29C 49/12*  (2006.01)
(52) U.S. Cl.
 USPC ........................... 264/532; 29/401.1; 425/529
(58) Field of Classification Search
 USPC ........................... 29/401.1; 425/529; 264/532
 See application file for complete search history.

(56) References Cited

U.S. PATENT DOCUMENTS

| | | | | |
|---|---|---|---|---|
| 2,366,066 | A | * | 12/1944 | Slick ............................... 65/217 |
| 4,105,391 | A | * | 8/1978 | Aoki ............................. 425/526 |
| 4,630,442 | A | * | 12/1986 | Massaro et al. ................ 60/415 |
| 5,866,175 | A | | 2/1999 | Latham |

FOREIGN PATENT DOCUMENTS

| | | |
|---|---|---|
| DE | 10212091 A1 | 10/2003 |
| DE | 102005034846 A1 | 2/2007 |
| EP | 1574318 A1 | 9/2005 |

OTHER PUBLICATIONS

German search report for 10 2011 076 062.8, dated Nov. 28, 2011.
Notification of the First Office Action, The State Intellectual Property Office of the People's Republic of China, Application No. 201210218534.2, dated Feb. 8, 2014.

* cited by examiner

*Primary Examiner* — Robert B Davis
(74) *Attorney, Agent, or Firm* — Marshall, Gerstein & Borun LLP

(57) ABSTRACT

A stretching system for stretch-blow molding machines for stretch blow molding containers from preforms, having at least one stretching unit which is hydraulically actuated for stretching a preform, with a hydraulic pressure tank which is at least partially filled with a hydraulic medium, for example water, and which is at least partially filled with a gaseous medium, for example compressed air; and wherein the stretching unit includes a stretching cylinder and a stretching piston, the stretching system being designed to conduct the hydraulic medium out of the hydraulic pressure tank to the stretching cylinder of the stretching unit, whereby the stretching piston in the stretching cylinder can be moved hydraulically.

23 Claims, 4 Drawing Sheets

HYDRAULIC STRETCHING

CROSS-REFERENCE TO RELATED APPLICATION

The present application claims the benefit of priority of German Application No. 102011076062.8, filed May 18, 2011. The entire text of the priority application is incorporated herein by reference in its entirety.

FIELD OF THE DISCLOSURE

The disclosure relates to a stretching system and corresponding method for stretch-blow molding machines for stretch-blow molding containers from performs, such as used in plastic container molding operations.

BACKGROUND

In blow molding machines for stretch-blow molding plastic containers, the container is typically formed from a preform and shaped to a container by means of compressed air. In stretch-blow molding machines, it is common to work with pneumatically or electrically driven stretching systems. This means that a preform is stretched by means of a stretching unit which is operated pneumatically or electrically. Here, the pneumatic/electric stretching cylinders of the stretching unit are frequently pressed onto a curved path. The shape of this curve determines and controls the motion sequence, i.e. the path of a piston in the stretching cylinder. In particular, the pressure in the stretching cylinder and thus the applied force for stretching can be checked thereby, and a maximum stretching power can be adjusted. Such a method is prior art. For example, U.S. Pat. No. 5,866,175 shows a stretch-blow molding machine with a corresponding control system. Several blow molding stations are arranged on a rotating wheel. The stretching process is carried out at the stations. The stretching process is controlled by compressed air. Such systems, however, require a considerable amount of compressed air which is normally consumed. There are ideas to at least partially reuse/recycle the compressed air, so that the consumption of air is reduced, but can often not be eliminated.

As an alternative, there are also systems, such as completely mechanical systems, where a circulating cam, for example a control rail, permanently guides the stretching systems. While no additional air is required, such machines often tend to strong vibrations due to the mechanical coupling which can be normally hard. Moreover, a completely circulating mechanical cam, i.e. complete mechanical guidance of the stretching unit, is very difficult to realize and often failure-prone. Furthermore, it is difficult to realize quick stretching speeds in such a system. The circulating cam, in particular a completely circulating cam unit/rail unit, moreover aggravates the accessibility to the machine.

SUMMARY OF THE DISCLOSURE

In view of the above outlined problems and prior art, it is one aspect of the present disclosure to provide a solution in which air consumption can be clearly reduced or even eliminated.

This aspect is achieved with a stretching system for stretch-blow molding machines for stretch-blow molding containers with at least one stretching unit.

The disclosure provides a stretching system for stretch-blow molding machines for stretch-blow molding containers from preforms, having at least one stretching unit which is hydraulically actuated for stretching a preform, with a hydraulic pressure tank which is at least partially filled with a hydraulic medium, for example water, and which is at least partially filled with a gaseous medium, for example compressed air; wherein the stretching unit comprises a stretching cylinder and a stretching piston, the stretching system being designed to conduct the hydraulic medium out of the hydraulic pressure tank to the stretching cylinder of the stretching unit, whereby the stretching piston can be hydraulically moved in the stretching cylinder.

So in the process, the stretching unit is no longer actuated pneumatically, but hydraulically. While in pneumatic stretching, compressed air is used in the stretching unit, the stretching unit is now actuated hydraulically. Losses of compressed air in the stretching unit can thus be avoided. The hydraulic medium is supplied from the hydraulic pressure tank. Typically, water can be used as hydraulic medium in the hydraulic pressure tank. However, it is also possible to use another suited hydraulic medium, in particular a hydraulic liquid other than water. For example, the hydraulic pressure tank is designed like a tank or kettle and forms, for example, a closed container. The hydraulic medium, e.g. water, is typically located in the lower part of the tank. Advantageously, more than half of the tank is filled with the hydraulic medium. Above the hydraulic medium, i.e. above the level of the medium, there is, for example, a gaseous medium, such as compressed air. It is also possible to use another gas, such as nitrogen, instead of compressed air. The compressed air is pressurized in the hydraulic pressure tank. The pressure of this compressed air in the hydraulic pressure tank drives the hydraulic medium to the stretching unit where the cylinder can be correspondingly actuated hydraulically. Since the compressed air in the hydraulic pressure tank is not directly used for actuating the stretching unit of the stretching system, the volume of the compressed air above the surface of the hydraulic medium in the hydraulic pressure storage is essentially constant. This means, on average, there are practically no losses of compressed air in the hydraulic pressure tank. The use of a hydraulic medium, such as water or other hydraulic media in the stretching unit furthermore brings about the advantage that these are not compressible. Correspondingly, no thermal losses occur when these media are used.

The stretching system can be equipped with a ring channel or with a pressure tank of another geometric shape (e.g. a sphere). The hydraulic medium moves, for example, the stretching piston in the stretching cylinder downwards for performing the stretching process. Furthermore, the hydraulic medium can also be used for moving the stretching piston in the stretching cylinder upwards. So, the stretching cylinder can in particular be a double-acting cylinder, where on either side of the stretching piston, hydraulic medium can be used for actuating the piston in the cylinder.

In the stretching system according to the disclosure as described above, the stretching system can furthermore comprise at least one supply line, such as a conduit or the like, to conduct the hydraulic medium out of the hydraulic pressure tank to the stretching cylinder. It can moreover comprise at least one line, such as a conduit or the like, to return the hydraulic medium from the stretching cylinder back to the hydraulic pressure tank. By this, losses of hydraulic medium can be prevented.

In the stretching system according to the disclosure as described above, the at least one supply line can comprise at least one first valve and moreover, the at least one line can comprise at least one second valve, the first and the second valves controlling the supply and discharge of the hydraulic medium out of the stretching cylinder. Since the hydraulic pressure tank is typically under pressure, the supply and discharge of hydraulic medium to or from the stretching cylinder, i.e. the stretching unit, is done, for example, by controlling the at least one valve of the supply line and the at least one valve of the discharge line/return line. Here, both the supply line and the discharge line can also comprise several valves. It is also possible for the supply line to comprise several separate supply lines. Here, each of the separate supply lines can comprise at least one valve. It is also possible that the at least one line for discharging comprises several partial lines, or that these partial lines are even separate. Here, too, these lines can each comprise at least one valve. The mentioned valves can comprise simple opening or closing valves. But they can also comprise directional valves with several switching positions. In particular, one valve with several switching positions for several paths can control the supply of hydraulic medium above or underneath the piston surface of the stretching piston in the stretching system. Equally, a valve can be provided in the line which discharges the hydraulic medium again from the stretching cylinder, the valve permitting to discharge hydraulic medium from the stretching cylinder above or underneath the piston surface of the stretching piston in the stretching cylinder. It will be understood that the employed valves can also close the corresponding lines, i.e. the supply and/or discharge/return lines. Equally, the valves can be controlled by a suited control unit, such as a computer. This control unit can also be provided externally. The control unit can optionally also be controlled in a wireless manner by an external controller, such as a computer, where a corresponding receiver can be provided in the system.

In the stretching system according to the disclosure as described above, the stretching system can furthermore comprise a pump, such as a piston pump, the pump being provided in the at least one line for returning the hydraulic medium into the hydraulic pressure tank.

The stretching system according to the disclosure as described above can furthermore comprise a second tank for accommodating the hydraulic medium which is, while the stretching piston is moved in the stretching cylinder, conducted out of the stretching cylinder, the second tank being provided in the at least one line for returning the hydraulic medium, the pump being provided between the second tank and the hydraulic pressure tank. So, the second tank functions as storage tank for the hydraulic medium. From this second tank, which can be a storage tank or a collecting tank for the hydraulic medium, the hydraulic medium can be pumped again into the hydraulic pressure tank. Here, the pump is typically designed such that it can pump the hydraulic medium out of the collecting tank of the hydraulic medium back into the hydraulic pressure tank against the internal pressure in the hydraulic pressure tank. The pump, which can be a piston pump, can be operated either electrically, or it can be driven mechanically, for example via the rotary motion of a blow-molding unit. In this case, the blow-molding unit can be designed as a rotary unit at which several blow molding stations can be provided. Equally, the piston pump can be driven by a compressed air motor. Optionally, the pump can also be driven by air, for example by compressed air, which can be saved at another point in the system.

The hydraulic pressure tank of the above-described stretching system can furthermore typically comprise a supply line for the gaseous medium. The supply line can be provided with a valve, for example a check valve. The hydraulic pressure tank can furthermore comprise a safety line with a safety valve. The pressure in the hydraulic pressure tank is kept on average constant via the volume of compressed air/gaseous medium above the surface of the hydraulic medium, for example water. The volume of this compressed air here functions as "buffer storage". For example, minor pressure variations that may be generated by a quick volume discharge of hydraulic medium into the stretching unit can be compensated by the volume. Here, the pressure in the hydraulic pressure tank is, for example, between a predefined minimum value and a predefined maximum value. This means that the pressure of the gaseous medium/compressed air can be supplied via a supply line with a check valve. The minimum pressure can be adjusted corresponding to the system and corresponding to the line. Furthermore, the hydraulic pressure tank can comprise a safety valve with a safety line which can take care that the pressure in the head space of the hydraulic pressure tank cannot exceed a predefined maximum value. With the two systems, the pressure in the hydraulic pressure tank can be between predefined, optionally system-specific, minimum and maximum pressure values. For example, the pressure can be between 6 bar and 10 bar.

So, in the head space volume, an on average constant pressure results. This pressure can comprise short pressure peaks corresponding to the quick discharge of hydraulic medium into the stretching unit. Correspondingly, the gas volume can be selected to be sufficiently large. The air compressed in the head space can temporarily heat up, but expands and thereby cools down so quickly that practically no heat losses can form which could have time enough to exit from the system. Due to the short periods during which expansion/compression takes place, the process is practically adiabatic.

The only heat lost is that by internal friction of the gas and the hydraulic liquid. This heat must be discharged by suited measures in permanent operation, but is essentially lower than the waste heat in the generation of compressed air for the pneumatic variant according to prior art.

In addition, a further form of energy storage could come into effect, e.g. a spring could be used to provide an additional possibility of storing pressure energy.

Furthermore, the return pump and valves in the return line could be optionally controlled via a pressure sensor in the head space with the aim of providing a pressure profile as uniform as possible in the head space.

The pressure in the second tank of the stretching system according to the disclosure can essentially correspond to ambient pressure. This means that the second tank is essentially depressurized compared to ambient pressure. The second tank can be embodied as not completely closed tank. In particular, the second tank can be embodied as a collecting tank.

The disclosure furthermore provides a method of stretching preforms by means of a stretching system, having at least one stretching unit comprising a stretching cylinder and a stretching piston, and with a hydraulic pressure tank which is at least partially filled with a hydraulic medium, such as water, and which is at least partially filled with a gaseous medium, for example compressed air, wherein the stretching unit comprises at least one supply line, for example a conduit, and at least one line, for example a conduit, the method comprising the stretching of a preform by hydraulic actuation of the stretching unit; and the supply of the hydraulic medium to the stretching cylinder of the stretching unit by the at least one supply line; and the movement of the stretching piston in the stretching cylinder by means of the supplied hydraulic medium.

For the stretching system according to the disclosure employed in the method, the above statements apply. For the supply line, the above statements apply, wherein the method can furthermore comprise controlling the first and second valves to supply and discharge the hydraulic medium. The stretching system can comprise a pump, such as a piston pump, the pump being provided in the at least one line for returning the hydraulic medium into the hydraulic pressure tank. Within the method, the method can comprise the step of pumping back the hydraulic medium from the second tank into the hydraulic pressure tank by the pump.

The disclosure can furthermore comprise a method of retrofitting blow molding stations of stretch-blow molding machines, wherein this method can comprise replacing at least one pneumatic stretching system with a pneumatic stretching unit by a stretching system as described above.

Thus, the present inventive system has advantages over a system which is operated pneumatically. The pump in the return line advantageously provides the possibility of shifting the hydraulic medium only at a central location, which finally actuates the stretching cylinders in a decentralized manner. The pump can take up such work nearly without losses from a mechanical movement/electric energy. A gaseous medium, such as compressed air, is compressible and heats up during compression. A hydraulic medium, such as water, does not show this problem.

This is the great energetic advantage of the stretching system according to the disclosure:

While in the conventional embodiment, during the generation of compressed air according to prior art, the arising compression heat (in most cases outside the blow molding machine) must be discharged which is elaborate (often even involving additional energetic consumption by a refrigerating machine), in the present disclosure, only displacement work of an incompressible medium against a spring (gas spring) is performed which is cancelled again just a moment later. Compression heat and expansion cold balance each other—apart from arising internal friction of the gas spring and the hydraulic medium.

In the hydraulic pressure tank, the compressed air can be used for adjusting an essentially constant mean pressure. The compensation of minor pressure variations in the hydraulic pressure tank is accomplished by the volume of compressed air. The volume of compressed air is essentially a volume to be filled once, a possible consumption of compressed air can here be normally very small compared to the order of several hundred cubic meters in a pneumatic system. The system even permits to retrofit existing plants.

BRIEF DESCRIPTION OF THE DRAWINGS

The subject matter of the disclosure will be explained by way of example with reference to the following drawings.

In the drawings.

DETAILED DESCRIPTION OF THE PREFERRED EMBODIMENT

Figure 1:
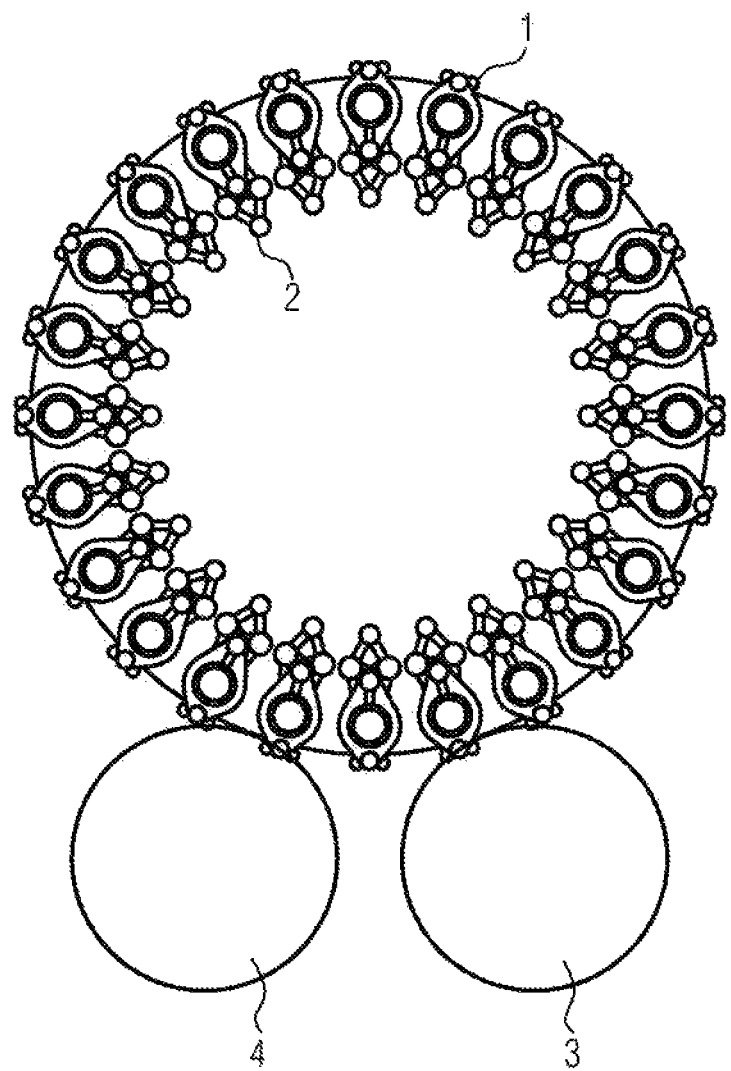
FIG. 1 shows a schematic plan view of a stretch-blow molding machine (rotary machine)

FIG. 1 shows a plan view of a stretch-blow molding machine for stretch blow molding containers, such as bottles, from preforms, as is known in prior art. The stretch-blow molding machine in FIG. 1 is designed as a rotary machine. The stretch-blow molding machine as rotary machine has, for example, a blow-molding unit 2 supporting blow molding stations 1 on its circumference. The blow-molding unit 2 represents a rotating part which is in relation to a stationary part (not explicitly shown here). FIG. 1 furthermore shows a transfer wheel 3 which can be a preform transfer wheel. By means of the transfer wheel 3, preforms can be transferred at blow molding stations 1 of the blow-molding unit 2. The blow-molding unit 2 can typically comprise several blow molding stations 1, for example, one blow-molding unit can comprise 40 blow molding stations. The number of blow molding stations of one blow-molding unit 2, however, can deviate from this value. Furthermore, FIG. 1 shows a transfer wheel 4 for transferring stretched, blow-molded containers, such as bottles. It will be understood that such tanks can be made of a material such as polyethylene terephthalate (PET).

It will be furthermore understood that the concept according to the disclosure can be also used without restrictions for stretch-blow molding machines where the blow molding stations or at least one blow molding station is arranged stationary (not shown here). It will be furthermore understood that temperature aspects, such as in particular a possible heating of preforms, are known to the person skilled in the art and are not discussed at this point.

A possible stretch-blow molding machine can be equipped similar to a Krones Contiform (trademark) machine.

Figure 2:
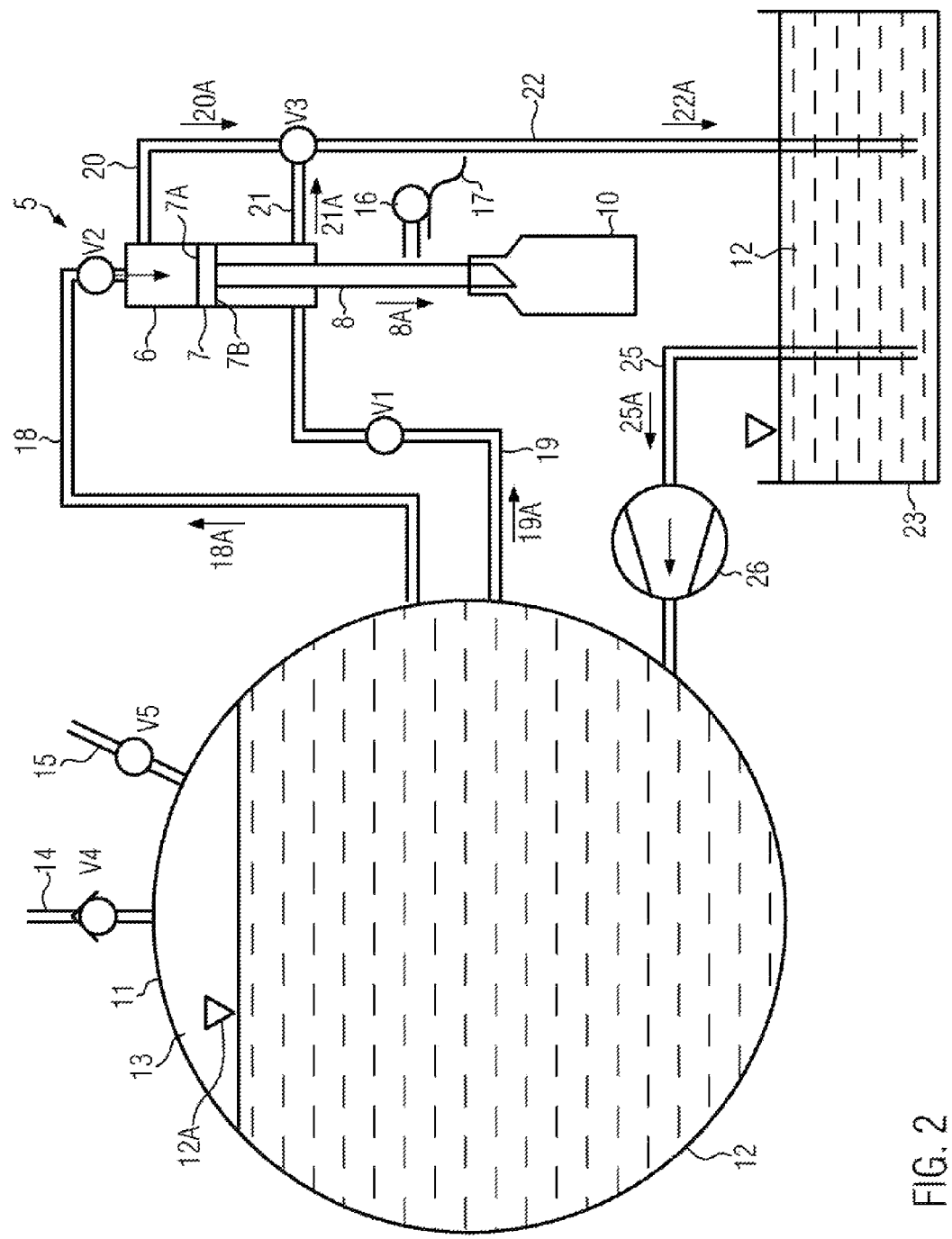
FIG. 2 shows a schematic diagram of a stretching system corresponding to the present disclosure.

FIG. 2 shows a stretching system according to the present disclosure for a stretch-blow molding machine for stretch-blow molding containers from preforms. FIG. 2 shows a stretching unit 5 with a stretching cylinder 6 and a stretching piston 7 as well as a stretching rod 8. At the stretching rod 8, a preform 10 is indicated which can be stretched by means of the stretching rod 8. The direction of stretching is designated by reference numeral 8A. The stretching rod 8 can be furthermore laterally provided with a guide roller 16. The guide roller 16 can be designed as a roller or as a wheel. The guide roller 16 can move on a guide rail 17. By the guide rail 17, at least the movement of the stretching rod 8 can be guided downwards and thus controlled. Due to the guide rail, the rod describes a curved path.

FIG. 2 furthermore shows that the stretching unit 5 of the stretching system can be supplied with a hydraulic medium 12, such as water, via supply lines 18 and 19. Equally, the hydraulic medium 12 can be discharged from the stretching cylinder 6 through lines 20, 21 and 22. Here, the lines 18 and 19 for supplying the hydraulic medium 12, and lines 20, 21 and 22 for discharging the hydraulic medium 12 can comprise valves. In FIG. 2, the line 19 comprises the valve V1. The direction of flow of the hydraulic medium 12 in the line 19 is indicated by arrow 19A. Equally, the supply line 18 comprises the valve V2. The direction of flow of the hydraulic medium 12 is indicated by the arrow 18A. The valves V1 and V2 in the lines 18 and 19 can be simple opening and closing valves. However, other forms of valves are also possible. In FIG. 2, the valve V3 is a valve that has at least one closing position, but which can also switch a flow path between the lines 20 and 22 on the one hand, or the lines 21 and 22. The direction of flow of the hydraulic medium 12 in the line 21 is indicated by arrow 21A. The direction of flow of the hydraulic medium 12 in the line 20 is indicated by arrow 20A. The direction of flow of the hydraulic medium 12 in the line 22 is equally indicated by arrow 22A. The lines 18, 19, 20, 21 and 22 can be designed as suited conduits. The conduits can be made of a suited material, such as plastic ceramic or metal. The stretching cylinder 6 in FIG. 2 is represented as a double-acting cylinder. In this cylinder, the line 20 is provided in its upper part near the upper end of the stretching cylinder 6. In its lower part near the lower end, the line 21 is provided in the stretching cylinder 6. The stretching piston 7, to which, for example, the stretching rod 8 is fixed, moves in the stretching cylinder 6. The stretching piston 7 has a surface 7a which is the upper surface of the stretching piston 7 in the drawing. The stretching piston 7 furthermore has another surface 7b which is the lower surface of the stretching piston 7 in FIG. 2. The stretching rod 8 is lead out of the stretching cylinder in the lower part of the stretching cylinder 6 in a suited manner. Corresponding seals are not shown in FIG. 2. In the stretching cylinder 6, as is shown in FIG. 2, hydraulic medium 12 can be located at any time above and underneath the surfaces 7a and 7b of the stretching piston 7 not only in the maximum positions, i.e. in which the stretching piston 7 is essentially completely shifted to the bottom or essentially completely shifted to the top. Correspondingly, the valves V1, V2 and V3 control in FIG. 2 the supply and discharge of hydraulic medium 12. The hydraulic medium 12 is fed from a hydraulic pressure tank 11 in FIG. 2. The hydraulic medium 12, for example water, is located in the hydraulic pressure tank 11. The hydraulic medium 12 takes, for example, the major portion of the volume of the hydraulic pressure tank 11. Typically, the hydraulic medium 12 is located in the lower region of the hydraulic pressure tank 11. In the upper region of the hydraulic pressure tank 11, a volume of a gaseous medium 13, such as compressed air, is provided. Between the gaseous medium 13 and the hydraulic medium 12, the surface of the hydraulic medium 12 is designated with reference numeral 12A. The compressed air of the volume, which is typically present in the upper part of the hydraulic pressure tank 11, generates an on average essentially constant pressure in the pressure tank 11. The pressure tank 11 furthermore comprises a supply line 14 for compressed air which is provided with a valve V4. For example, in FIG. 2, the valve V4 is designed as a check valve 4. The supply line 14 can essentially serve to fill the compressed air volume 13 in the hydraulic pressure tank 11 with compressed air. Moreover, via this supply line 14, compressed air can be optionally refilled into the hydraulic pressure tank 11. Instead of compressed air, another suited gaseous medium can be used. The hydraulic pressure tank 11 is furthermore provided with a safety line 15 in FIG. 2. The latter is provided with a valve V5 which is designed as a pressure-control valve. By the use of the supply line with the valve V4 which is designed as check valve and the safety line 15 with the valve V5 which is designed as safety valve, i.e. pressure-control valve, the pressure inside the hydraulic pressure tank 11, i.e. in particular in the region of the compressed air volume, can be maintained between a predefined minimum value and a predefined maximum value. Optionally, this value can be adjusted or controlled, for example, via the valves V4 and V5. For example, in the hydraulic pressure tank 11 in FIG. 2, a pressure between 6 and 10 bar can prevail. Furthermore, the hydraulic pressure tank 11 is provided with a supply line 25. Through the supply line 25 which has a direction of flow 25A, hydraulic medium 12 flows again into the hydraulic pressure tank 1. Here, it should be noted that a pump 26, which is, for example, a piston pump, can achieve the pumping back of hydraulic medium 12 into the hydraulic pressure tank 11 and thereby also prevent hydraulic medium 12 from flowing back from the hydraulic pressure tank 11 through the line 25. It is also possible to provide the line 25 with a further safety valve, e.g. a check valve (not shown here), which can prevent hydraulic medium 12 from flowing back.

FIG. 2 shows a second tank 23 between the lines 22 and 25. This second tank is designed as a collecting tank. In FIG. 2, this tank is outlined as an open tank. However, it can also be an at least partially closed tank. Equally, a closed tank with a pressure compensation function or a venting function is possible. The pressure in the second tank 23 should not essentially deviate from ambient pressure. The second tank 23 accommodates, for example, hydraulic medium 12 which drains from the stretching cylinder 6 during the stretching procedure, i.e. the tensioning of the stretching cylinder 6, or during the shifting upwards of the stretching piston 7, i.e. the release of the stretching cylinder 6. Since the hydraulic pressure tank 11 is closed and the line 25 prevents, by the pump 26, hydraulic medium 12 from flowing out of or even back to the hydraulic pressure tank 11, the discharge of hydraulic medium 12 out of the hydraulic pressure tank 11 is correspondingly controlled by the valves V1, V2, and V3. A control can be accomplished by a corresponding controller and/or control unit, for example, the control can be accomplished by an external computer.

In one variant, the container 23 could be designed as a closed pressure tank in which a pressure is adjusted that must be smaller than in the tank 11. In this constellation, the displacement work of the pump 26 would be relieved and thus additional energy could be saved.

In one example, a stretching cylinder with a volume of about 0.5 l will be considered. The pump is intended to push back the hydraulic medium, for example water, into the hydraulic pressure tank at about 6 bar. The machine, which is, for example, equipped with several stretching units, can process, for example, 36000 bottles per hour. For each bottle, a maximum stroke (sum of upward and downward strokes) of a volume of 2×0.5 l results in one stretching procedure. This results in a required power of about 6 kW. Correspondingly, possible losses result from the efficiency of the pump. If several circuits were provided for actuating the stretching cylinder, the required power could be further reduced, for example, if for the actuation of the stretching cylinder, two circuits were provided.

For comparison, a stretching unit operated with compressed air will be looked at. There, one would also have a pressure of about 6 bar. The volume demand of compressed air for the already mentioned number of about 36000 bottles per hour is typically about 200 $m^3$/h. Altogether, a power consumption of about 25 kW (incl. cooler) would be required for this in a well-known commercially available 6 bar compressor.

This means, the required power in the first, hydraulic case is clearly lower than in the second, pneumatic case.

Figure 3:
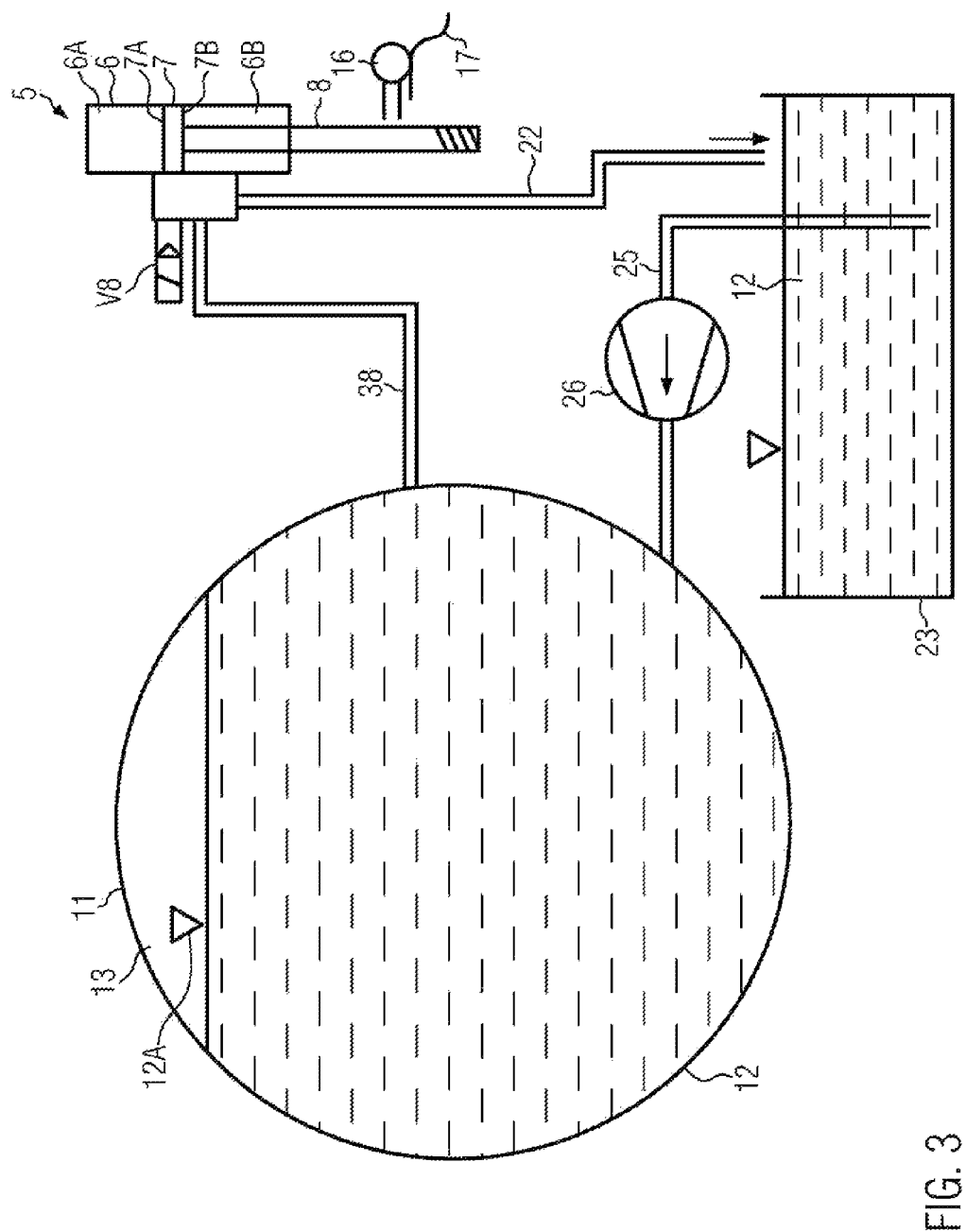
FIG. 3 shows another embodiment of a stretching system corresponding to the present disclosure.

FIG. 3 shows a further embodiment corresponding to the present disclosure. The elements of FIG. 3 are similar to the elements of FIG. 2. The same elements are designated with the same reference numerals in FIG. 3. In FIG. 3, no supply line with check valve and safety line with safety valve are explicitly shown. However, it will be understood that these elements can also be present in FIG. 3 and correspond to the elements as shown in FIG. 2. In FIG. 3 in contrast to FIG. 2, the supply line and return line of hydraulic medium 12 to the stretching unit 5, i.e. to the stretching cylinder 6, are designed differently. A supply line 38 leads to a valve element V8 which can be connected, for example, electronically. This valve element can be connected such that it is suited for tensioning the stretching piston 7 in the stretching cylinder 6, i.e. for moving it downwards as is shown in the drawing, or for moving the stretching piston 7 upwards in the stretching cylinder 6. This means that the unit V8 can conduct hydraulic medium 12 into the stretching cylinder 6 either above the surface 7a, i.e. the upper surface of the stretching piston 7, or underneath the surface 7b, i.e. the lower surface of the stretching piston 7. Equally, the unit with valve V8 can conduct, when the stretching piston 7 is moved, hydraulic medium 12 out of the region of the stretching cylinder 6 which is each reduced by the movement or during the movement of the stretching piston 7.

This hydraulic medium 12 reaches the second tank 23 through the line 22. It will be understood that the unit with the valve V8 is only schematically drawn in FIG. 3. The other functions in FIG. 3 correspond to those of the elements in FIG. 2.

Figure 4:
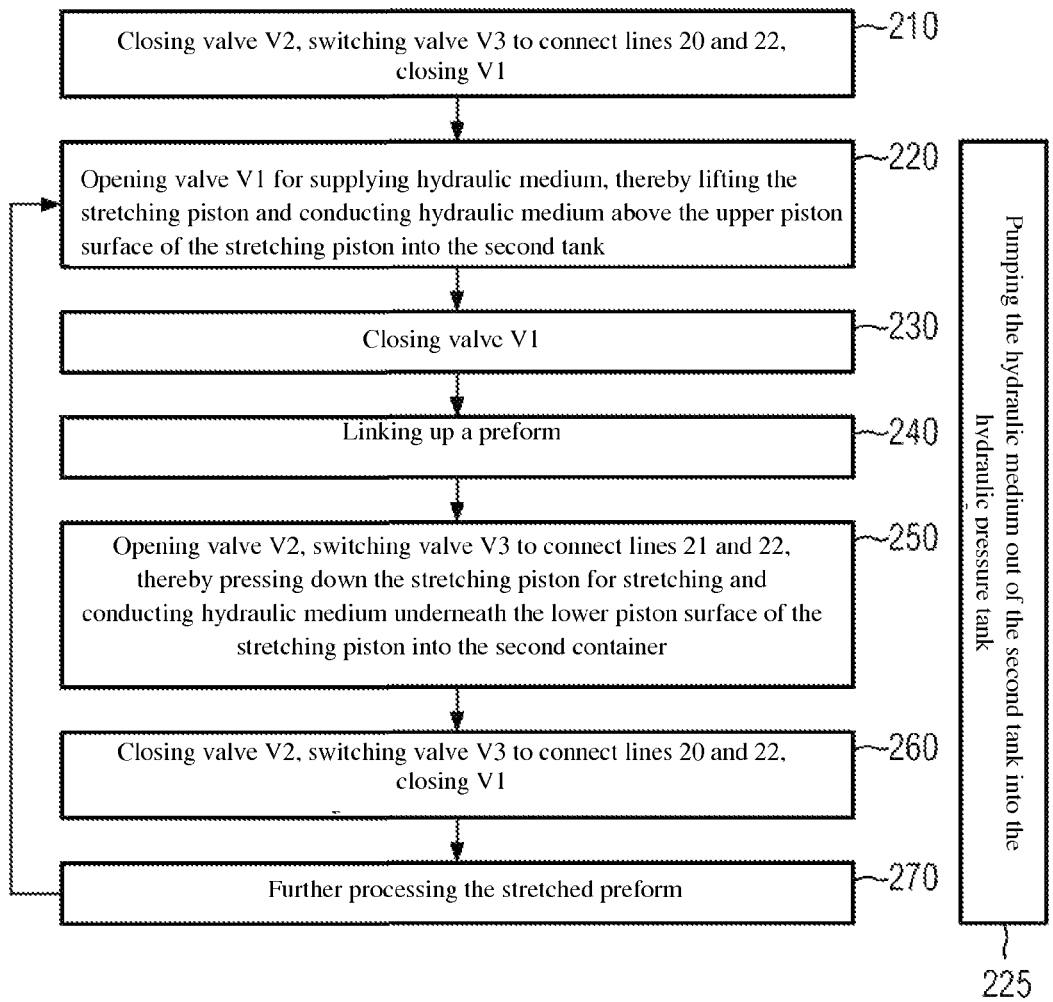
FIG. 4 shows a method of stretching preforms by means of a stretching system corresponding to the present disclosure.

FIG. 4 shows a method according to the disclosure which can be carried out corresponding to FIG. 2 or analogously corresponding to FIG. 3. The method of stretching preforms by means of a stretching system corresponding to the mentioned figures includes the following steps. In preparation, which is not explicitly mentioned in FIG. 4, the hydraulic pressure tank 11 is already filled with hydraulic medium 12, for example water, and a gaseous medium 13, for example, compressed air. So, an overpressure prevails in the hydraulic pressure tank 11. In step 210, the valve V2 is closed. Furthermore, the valve V3 is switched to connect lines 20 and 22 in FIG. 2. Furthermore, the valve V1 is closed in the line 19 of FIG. 2. Correspondingly, the valve V8 would close the supply line 38 and the return line 22 in FIG. 3.

In step 220, the valve V1 is opened for supplying the hydraulic medium 12, the stretching piston 7 being thereby shifted upwards in the stretching cylinder 6. Above the surface 7a of the stretching piston 7, present hydraulic medium 12 is discharged out of the stretching cylinder 6 via the line 20 which is switched to be connected with the line 22 via the valve V3. The discharged hydraulic medium 12 is conducted into the second tank 23. Correspondingly, the unit V8 would be switched in FIG. 3 to permit the supply of hydraulic medium 12 through the line 38 and the discharge of hydraulic medium 12 through the line 22. Here, it should be noted that the proportions in FIG. 3 are not drawn to scale.

In step 230, the valve V1 is closed. This is done when the stretching piston 7 in the stretching cylinder 6 has reached its maximum, i.e. uppermost, position. This position does not necessarily have to flush with the upper end of the piston, but normally, the complete stroke upwards in the stretching cylinder 6 will be utilized. Above the surface 7a of the stretching piston 7, there now only is little hydraulic medium 12, while the stretching piston 7 is filled with hydraulic medium 12 underneath the surface 7b. At this point, in step 240 a preform is introduced into the blow molding station, so that the preform is now located underneath the stretching rod (not shown) which is driven by the stretching rod 8. In step 250, the valve V2 is opened and the valve V3 is switched to connect lines 21 and 22 in FIG. 2. By opening the valve V2 and switching the valve V3, the pressing down of the stretching piston 7 for stretching is permitted and hydraulic medium 12 underneath the surface 7b is conducted out of the stretching cylinder 6 through the line 21. This hydraulic medium 12 is in turn conducted into the second tank. Correspondingly, the valve V8 would be switched in FIG. 3 such that the supply through the line 38 is possible, but now hydraulic medium 12 is introduced above the surface 7a of the stretching piston 7 and presses the latter down.

In step 260, the valve V2 is closed, moreover, the valve V3 is switched, the lines 20 and 22 are connected and the valve V1 is closed. Step 260 is performed when the stretching piston 7 in the stretching cylinder 6 has performed the desired stroke distance. This can be, for example, the maximum stroke distance downwards in the stretching cylinder 6. At this point in time, only little hydraulic medium 12 is located underneath the surface 7b. Correspondingly, in FIG. 3, too, the valve V8 would switch the corresponding unit such that the supply and discharge through the lines 38 and 22 would be prevented. Subsequently, the stretched preform can be further processed in step 270. The system can then return to step 220, and hydraulic medium 12 can be again supplied by switching the valves, first valve V1, to move the stretching piston 7 upwards again in the stretching cylinder 6. During steps 220 to 270, in step 225, the pumping of the hydraulic medium 12 out of the second tank 23 back to the hydraulic pressure tank 11 can be effected, as an accompanying measure, by means of the pump 26. This pumping operation can be effected, for example, continuously, or at suited, for example short, intervals.

The disclosure also provides the possibility of retrofitting an already existing system, for example a Krones Contiform (trademark) unit or other stretch-blow molding machines. Such machines often comprise units which aim to recycle compressed air from the system if possible. Such recycled compressed air would no longer have to be supplied to the stretching cylinders due to the use of hydraulically actuated stretching cylinders. Here, it offers itself, for example, to convert this air into electricity in the blow-molding unit and to feed back the generated energy into the blow molding machine. This would result in the possibility of further reducing the total energy demand of the machine. For the conversion into electricity in the blow-molding unit, one could consider, for example, a turbine operated by compressed air which is coupled to a generator. This is a robust solution which can be well applied for a closed existing system. This means, the disclosure permits to further use the recycled compressed air in the system when existing systems are retrofitted and to further reduce the energy demand of the system.

It will be understood that features mentioned in the above described embodiments are not particularly restricted to the combinations shown in the figures but are also possible in any other combinations.

The invention claimed is:

1. A stretching system for stretch-blow molding machines for stretch-blow molding containers from preforms, comprising at least one stretching unit which is hydraulically actuated for stretching a preform, with a hydraulic pressure tank which is at least partially filled with a hydraulic medium, and which is at least partially filled with a gaseous medium, the stretching unit comprising a stretching cylinder and a stretching piston, the stretching system designed to conduct the hydraulic medium out of the hydraulic pressure tank to the stretching cylinder of the stretching unit, whereby the stretching piston can be hydraulically moved in the stretching cylinder; further comprising a second tank for accommodating the hydraulic medium which is conducted out of the stretching cylinder when the stretching piston is moved in the stretching cylinder, wherein the second tank is provided in at least one line for returning the hydraulic medium and further comprising a pump, the pump being provided between the second tank and the hydraulic pressure tank.

2. The stretching system according to claim 1, wherein the stretching unit further comprises at least one supply line, for conducting the hydraulic medium out of the hydraulic pressure tank to the stretching cylinder.

3. The stretching system according to claim 2, wherein the at least one supply line comprises at least one first valve, and wherein the at least one line comprises at least one second valve, the first and the second valves controlling the supply and discharge of the hydraulic medium out of the stretching cylinder.

4. The stretching system according to claim 1, wherein the hydraulic pressure tank comprises a supply line for the gaseous medium which is provided with a valve, and wherein the hydraulic pressure tank comprises a safety line with a safety valve.

5. The stretching system according to claim 1, wherein the pressure in the hydraulic pressure tank lies between a predefined minimum value and a predefined maximum value.

6. The stretching system according to claim 1, wherein the pressure in the second tank corresponds to ambient pressure.

7. The stretching system according to claim 1, wherein the second tank is a collecting tank.

8. A method of stretching preforms by a stretching system having at least one stretching unit, wherein the stretching unit comprises a stretching cylinder and a stretching piston, and with a hydraulic pressure tank which is at least partially filled with a hydraulic medium, and at least partially filled with a gaseous medium, the stretching comprising at least one supply line, and at least one line for returning the hydraulic medium to the hydraulic pressure tank, the method comprising:
  stretching a preform by hydraulic actuation of the stretching unit;
  supplying the hydraulic medium to the stretching cylinder of the stretching unit through the at least one supply line; and
  moving the stretching piston in the stretching cylinder via the supplied hydraulic medium;
  wherein the stretching system furthermore comprises a pump, the pump being provided in the at least one line for returning the hydraulic medium, wherein the stretching system further comprises a second tank for accommodating the hydraulic medium which is conducted out of the stretching cylinder when the stretching piston is moved in the stretching cylinder, wherein the second tank is provided in the at least one line for returning the hydraulic medium, and wherein the pump is provided between the second tank and the hydraulic pressure tank.

9. The method according to claim 8, further comprising returning the hydraulic medium to the hydraulic pressure tank through the at least one line.

10. The method according to claim 9, wherein the at least one supply line comprises at least one first valve, and wherein the at least one line comprises at least one second valve, and controlling the first and second valves for supplying and discharging the hydraulic medium.

11. The method according to claim 8, and pumping back the hydraulic medium from the second tank into the hydraulic pressure tank.

12. A method of retrofitting blow molding stations of stretch-blow molding machines, comprising:
  replacing at least one pneumatic stretching system with a pneumatic stretching unit by a stretching system for stretch-blow molding machines for stretch-blow molding containers from preforms, comprising at least one stretching unit which is hydraulically actuated for stretching a preform, with a hydraulic pressure tank which is at least partially filled with a hydraulic medium and which is at least partially filled with a gaseous medium wherein, the stretching unit comprising a stretching cylinder and a stretching piston, the stretching system designed to conduct the hydraulic medium out of the hydraulic pressure tank to the stretching cylinder of the stretching unit, whereby the stretching piston can be hydraulically moved in the stretching cylinder;
  furthermore comprising a second tank for accommodating the hydraulic medium which is conducted out of the stretching cylinder when the stretching piston is moved in the stretching cylinder, wherein the second tank is provided in the at least one line for returning the hydraulic medium, and further comprising a pump, the pump being provided between the second tank and the hydraulic pressure tank.

13. The stretching system according to claim 1, wherein the hydraulic medium is water.

14. The stretching system according to claim 1, wherein the gaseous medium is compressed air.

15. The stretching system according to claim 2, wherein the at least one supply line is a conduit.

16. The stretching system according to claim 2, wherein the at least one line is a conduit.

17. The stretching system according to claim 1, wherein the pump is a piston pump.

18. The stretching system according to claim 4, wherein the valve comprises a check valve.

19. The method according to claim 8, wherein the hydraulic medium comprises water.

20. The method according to claim 8, wherein the gaseous medium comprises compressed air.

21. The method according to claim 8, wherein the one supply line is a conduit.

22. The method according to claim 8, wherein the one line is a conduit.

23. The method according to claim 8, wherein the pump is a piston pump.

* * * * *